(12) United States Patent
Masuda et al.

(10) Patent No.: US 10,890,834 B2
(45) Date of Patent: Jan. 12, 2021

(54) LIGHT MODULATION APPARATUS, OPTICAL MODULE, AND PROJECTOR

(71) Applicant: SEIKO EPSON CORPORATION, Tokyo (JP)

(72) Inventors: Tomoharu Masuda, Matsumoto (JP); Masanori Yasuda, Matsumoto (JP); Kohei Nakazaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/804,902

(22) Filed: Feb. 28, 2020

(65) Prior Publication Data
US 2020/0278597 A1 Sep. 3, 2020

(30) Foreign Application Priority Data

Feb. 28, 2019 (JP) ................................. 2019-035562
Feb. 28, 2019 (JP) ................................. 2019-035570

(51) Int. Cl.
| | |
|---|---|
| *G03B 21/00* | (2006.01) |
| *H04N 9/31* | (2006.01) |
| *G03B 21/14* | (2006.01) |
| *G02F 1/1335* | (2006.01) |
| *G02B 27/10* | (2006.01) |

(52) U.S. Cl.
CPC ....... *G03B 21/147* (2013.01); *G02B 27/1046* (2013.01); *G02F 1/133512* (2013.01); *G02F 1/133528* (2013.01); *G03B 21/006* (2013.01); *H04N 9/3105* (2013.01); *G02F 2001/133548* (2013.01)

(58) Field of Classification Search
CPC .. G03B 21/006; G03B 21/147; H04N 9/3105; G02B 27/1046; G02B 27/288; G02F 1/133528; G02F 2001/133548
See application file for complete search history.

(56) References Cited

U.S. PATENT DOCUMENTS 7,936,403 B2 * 5/2011 Horikoshi ............ H04N 9/3105
349/9
2008/0316396 A1 12/2008 Horikoshi et al.

FOREIGN PATENT DOCUMENTS

JP 2009-003106 A 1/2009

* cited by examiner

*Primary Examiner* — Ryan D Howard
(74) *Attorney, Agent, or Firm* — Oliff PLC

(57) ABSTRACT

A light modulation includes a light modulator, a first polarizer wherein light outputted from the light modulator is incident, and a second polarizer wherein light outputted from the first polarizer is incident. The first polarizer includes a first base having a first and second surface, a first light absorbing layer to face the first base, and a first inorganic polarization layer on the first surface, disposed between the first base and first light layer. The second polarizer includes a second base having a third and fourth surface, a second light absorbing layer to face the second base, and a second inorganic polarization layer on the third surface, disposed between the second base and second light layer. The first polarizer is disposed the first light layer faces a light exiting surface. The second polarizer is disposed the fourth surface of the second base faces the second surface of the first base.

10 Claims, 4 Drawing Sheets

LIGHT MODULATION APPARATUS, OPTICAL MODULE, AND PROJECTOR

The present application is based on, and claims priority from JP Application Serial Numbers 2019-035562 and 2019-035570, both filed Feb. 28, 2019, the disclosure of which is hereby incorporated by reference herein in its entirety.

BACKGROUND

1. Technical Field

The present disclosure relates to a light modulation apparatus, an optical module, and a projector.

2. Related Art

In a light modulation apparatus that forms a projector, to increase the extinction ratio of a light-exiting-side polarizing plate of a liquid crystal panel for an increase in contrast of a projection image, there has been a proposal to employ a configuration in which the light-exiting-side polarizing plate is formed of two polarizing plates.

For example, JP-A-2009-3106 discloses a projector having a configuration in which an inorganic polarizing plate and an organic polarizing plate are disposed on the light exiting side of the liquid crystal panel in the presented order from the side facing the liquid crystal panel. JP-A-2009-3106 describes that the use of the inorganic polarizing plate and the organic polarizing plate provides a high extinction ratio and high optical transparency as the entire polarizing plate because a typical organic polarizing plate provides a high extinction ratio and high optical transparency.

Employing an organic polarizing plate as part of the light-exiting-side polarizing plate, as in the projector described in JP-A-2009-3106, however, has a problem of a decrease in reliability of the projector because an organic polarizing plate is greatly degraded due to light as compared with an inorganic polarizing plate. In contrast, employing an inorganic polarizing plate is likely to produce stray light and return light in the space between the inorganic polarizing plate and a downstream light combining prism or projection system because the inorganic polarizing plate includes a high-reflectance inorganic polarization layer whereas improving the reliability, resulting in a problem of a ghost and light leakage due to the stray light and the return light.

SUMMARY

A light modulation apparatus according to an aspect of the present disclosure includes a light modulator that modulates light, a first polarizer on which light outputted from the light modulator is incident, and a second polarizer on which light outputted from the first polarizer is incident. The first polarizer includes a first base having a first surface and a second surface, a first inorganic polarization layer provided on the first surface, and a first light absorbing layer so provided as to face the first base with the first inorganic polarization layer sandwiched between the first base and the first light absorbing layer. The second polarizer includes a second base having a third surface and a fourth surface, a second inorganic polarization layer provided on the third surface, and a second light absorbing layer so provided as to face the second base with the second inorganic polarization layer sandwiched between the second base and the second light absorbing layer. The first polarizer is so disposed that the first light absorbing layer faces a light exiting surface of the light modulator. The second polarizer is so disposed that the fourth surface of the second base faces the second surface of the first base.

In the light modulation apparatus according to the aspect of the present disclosure, the first inorganic polarization layer may be formed of a wire-grid polarization layer.

In the light modulation apparatus according to the aspect of the present disclosure, the second inorganic polarization layer may be formed of a wire-grid polarization layer.

In the light modulation apparatus according to the aspect of the present disclosure, at least one of the first and second bases may be made of low thermal expansion glass.

An optical module according to another aspect of the present disclosure includes a first light modulation apparatus that modulates first color light based on an image signal, a second light modulation apparatus that modulates second color light based on an image signal, a third light modulation apparatus that modulates third color light based on an image signal, and a light combiner that combines the first color light modulated by the first light modulation apparatus, the second color light modulated by the second light modulation apparatus, and the third color light modulated by the third light modulation apparatus with one another to produce combined light, and at least one of the first light modulation apparatus, the second light modulation apparatus, and the third light modulation apparatus is the light modulation apparatus according to the aspect of the present disclosure.

A projector according to another aspect of the present disclosure includes a light source apparatus that outputs light, the optical module according to the other aspect of the present disclosure on which the light outputted from the light source apparatus is incident and which outputs the combined light, and a projection optical apparatus that projects the combined light outputted from the optical module on a projection receiving surface.

A projector according to still another aspect of the present disclosure includes a light source apparatus that outputs light, a light modulation apparatus that modulates the light outputted from the light source apparatus based on an image signal, and a projection optical apparatus that projects the light modulated by the light modulation apparatus on a projection receiving surface, and the light modulation apparatus is the light modulation apparatus according to the aspect of the present disclosure.

DESCRIPTION OF EXEMPLARY EMBODIMENTS

First Embodiment

A first embodiment of the present disclosure will be described below with reference to FIGS. 1 and 2.

A projector according to the present embodiment is a three-plate liquid crystal projector that uses three liquid crystal panels as light modulators to display a color image on a screen (projection receiving surface).

In the following drawings, components are drawn at different dimensional scales in some cases for clarity of each of the components.

Figure 1:
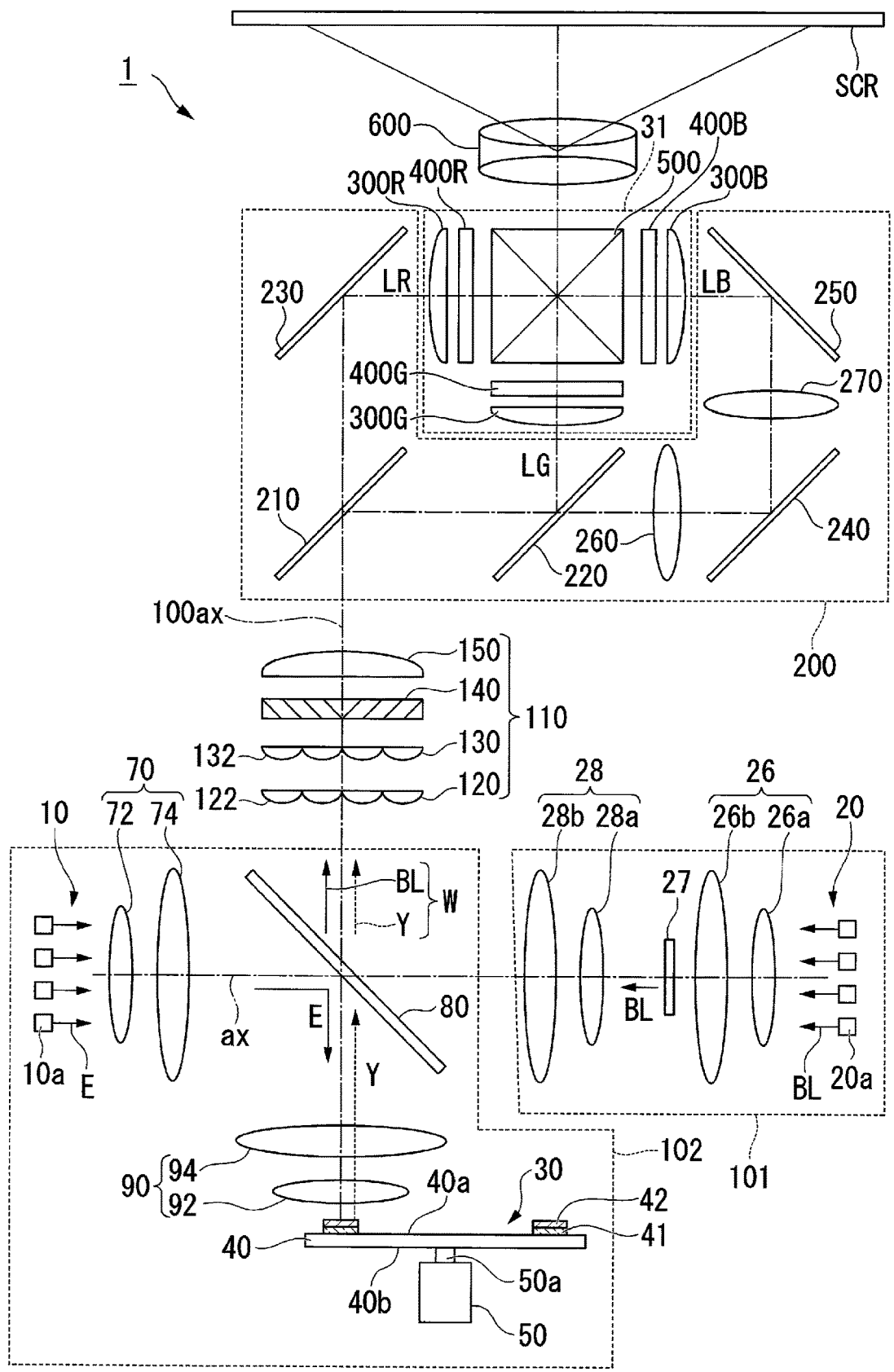
FIG. 1 is a schematic configuration diagram of a projector according to a first embodiment.

FIG. 1 is a schematic configuration diagram showing the optical system of a projector 1 according to the present embodiment.

The projector 1 includes a first light source section 101, a second light source section 102, a uniform illumination system 110, a color separation/light guide system 200, an optical module 31, and a projection optical apparatus 600, as shown in FIG. 1.

The optical module 31 includes a light modulation apparatus 400B for blue light (first light modulation apparatus), a light modulation apparatus 400G for green light (second light modulation apparatus), a light modulation apparatus 400R for red light (third light modulation apparatus), and a light combiner 500.

The first light source section 101 includes a first light source 20, a light focusing system 26, a diffuser plate 27, and a collimation system 28.

The first light source 20 includes a plurality of semiconductor laser devices 20a, which are each a solid-state light source. The semiconductor laser devices 20a each output blue light BL having emitted light intensity that peaks, for example, at a wavelength of 460 nm. The first light source 20 may instead be formed of a single semiconductor laser device 20a. The first light source 20 may still instead be formed of semiconductor laser devices each outputting blue light having a peak wavelength other than 460 nm. The semiconductor laser devices 20a may each instead output blue light BL having emitted light intensity that peaks, for example, at a wavelength ranging from 430 nm to 480 nm.

The light focusing system 26 includes a first lens 26a and a second lens 26b. The light focusing system 26 focuses the blue light outputted from the first light source 20 on the downstream diffuser plate 27 or in the vicinity thereof. The first lens 26a and the second lens 26b are each formed of a convex lens.

The diffuser plate 27 diffuses the blue light BL outputted from the first light source 20 to convert the blue light BL into blue light BL having a light orientation distribution close to the light orientation distribution of fluorescence Y outputted from a downstream wavelength converter 30. The diffuser plate 27 can be formed, for example, of a ground glass plate made of optical glass.

The collimation system 28 includes a first lens 28a and a second lens 28b. The collimation system 28 substantially parallelizes the light having exited out of the diffuser plate 27. The first lens 28a and the second lens 28b are each formed of a convex lens.

The second light source section 102 includes a second light source 10, a collimation system 70, a dichroic mirror 80, a collimation/light focusing system 90, and a wavelength converter 30.

The second light source 10 includes a plurality of semiconductor laser devices 10a. The semiconductor laser devices 10a each output blue light E having emitted light intensity that peaks, for example, at a wavelength of 445 nm. The second light source 10 may instead be formed of a single semiconductor laser device 10a. The second light source 10 may still instead be formed of semiconductor laser devices each outputting blue light having a peak wavelength other than 445 nm. The semiconductor laser devices 10a may each instead output blue light E having emitted light intensity that peaks, for example, at a wavelength ranging from 430 nm to 480 nm.

The collimation system 70 includes a first lens 72 and a second lens 74. The collimation system 70 substantially parallelizes the blue light E outputted from the second light source 10. The first lens 72 and the second lens 74 are each formed of a convex lens.

The dichroic mirror 80 is so disposed in the optical path of the blue light E between the collimation system 70 and the collimation/light focusing system 90, which will be described later, as to intersect an optical axis ax of the second light source 10 and an illumination optical axis $100ax$ at 45°. The dichroic mirror 80 reflects the blue lights BL and E and transmits the fluorescence Y, which is yellow fluorescence containing red light and green light.

The collimation/light focusing system 90 includes a first lens 92 and a second lens 94. The collimation/light focusing system 90 substantially focuses the blue light E reflected off the dichroic mirror 80, causes the substantially focused blue light E to enter a phosphor layer 42 of the wavelength converter 30, which will be described later, and substantially parallelizes the fluorescence Y outputted from the wavelength converter 30. The first lens 92 and the second lens 94 are each formed of a convex lens.

The wavelength converter 30 includes a disc 40, a reflection film 41, the phosphor layer 42, and a motor 50. The disc 40 can be rotated by the motor 50. The phosphor layer 42 is annually provided on an upper surface 40a of the disc 40 along the circumferential direction thereof. The motor 50 is disposed on the side facing a lower surface 40b of the disc 40, and a rotary shaft 50a of the motor 50 is connected to the disc 40.

The phosphor layer 42 converts the blue light E outputted from the second light source 10 into the fluorescence Y, which belongs to a wavelength band ranging, for example, from 520 nm to 580 nm. The fluorescence Y is yellow light containing red light and green light. An antireflection film (not shown) for preventing reflection of the blue light E is provided on the surface of the phosphor layer 42.

Since the blue light E formed of laser beams enters the phosphor layer 42, heat is generated in the phosphor layer and degrades the function thereof. In the present embodiment, the disc 40 is rotated to successively change the light incident position on the phosphor layer 42 where the blue light E is incident. The thus configured wavelength converter 30 prevents the same location of the phosphor layer 42 from being irradiated with the blue light E in a concentrated manner and therefore prevents degradation of the phosphor layer 42.

In the present embodiment, the phosphor layer 42 is formed, for example, of a ceramic phosphor layer, which suppresses an increase in temperature of the phosphor layer 42 and therefore suppresses light emission failure called temperature quenching. The phosphor layer 42 is formed, for example, of a bulk (block-shaped) YAG-based phosphor made, for example, of $(Y, Gd)_3(Al, Ga)_5O_{12}:Ce$. The thus formed phosphor layer 42 can emit the fluorescence Y at high efficiency.

The blue light BL outputted from the first light source 20 is reflected off the dichroic mirror 80 and then combined with the yellow fluorescence Y having been outputted from the wavelength converter 30 and having passed through the dichroic mirror 80 to form white light W. The white light W enters the uniform illumination system 110.

The uniform illumination system 110 includes a first lens array 120, a second lens array 130, a polarization converter 140, and a superimposing lens 150.

The first lens array 120 includes a plurality of first lenses 122, which divide the light having passed through the dichroic mirror 80 into a plurality of sub-light fluxes. The plurality of first lenses 122 are arranged in a matrix in a plane perpendicular to the illumination optical axis 100ax.

The second lens array 130 includes a plurality of second lenses 132 corresponding to the plurality of first lenses 122 of the first lens array 120. The second lens array 130 along with the superimposing lens 150 forms images of the first lenses 122 of the first lens array 120 in the vicinity of an image formation area of each of the light modulation apparatuses 400R, 400G, and 400B. The plurality of second lenses 132 are arranged in a matrix in a plane perpendicular to the illumination optical axis 100ax.

The polarization converter 140 converts each of sub-light fluxes divided by the first lens array 120 into linearly polarized light. The polarization converter 140 includes, although not shown, polarization separation layers, reflection layers, and retardation layers. The polarization separation layers directly transmit one linearly polarized component out of the polarization components contained in the light from the wavelength converter 30 and reflect another linearly polarized component toward the reflection layers. The reflection layers reflect the other linearly polarized component reflected off the polarization separation layers in the direction parallel to the illumination optical axis 100ax. The retardation layers convert the other linearly polarized component reflected off the reflection layers into the one linearly polarized component.

The superimposing lens 150 collects the sub-light fluxes from the polarization converter 140 and superimposes the collected sub-light fluxes on one another in the vicinity of the image formation area of each of the light modulation apparatuses 400R, 400G, and 400B. The first lens array 120, the second lens array 130, and the superimposing lens 150 form an optical integration system that homogenizes the in-plane optical intensity distribution of the light having exited out of the wavelength converter 30.

The color separation/light guide system 200 includes a dichroic mirror 210, a dichroic mirror 220, a reflection mirror 230, a reflection mirror 240, a reflection mirror 250, a relay lens 260, and a relay lens 270. The color separation/light guide system 200 separates the white light W into red light LR, green light LG, and blue light LB, guides the red light LR to the light modulation apparatus 400R for red light, guides the green light LG to the light modulation apparatus 400G for green light, and guides the blue light LB to the light modulation apparatus 400B for blue light.

A field lens 300R is disposed between the color separation/light guide system 200 and the light modulation apparatus 400R for red light. A field lens 300G is disposed between the color separation/light guide system 200 and the light modulation apparatus 400G for green light. A field lens 300B is disposed between the color separation/light guide system 200 and the light modulation apparatus 400B for blue light.

In the present embodiment, the red light LR corresponds to light that belongs to a wavelength band ranging from 590 nm to 700 nm. The green light LG corresponds to light that belongs to a wavelength band ranging from 480 nm to 590 nm. The blue light LB corresponds to light that belongs to a wavelength band ranging from 430 nm to 480 nm.

The dichroic mirror 210 transmits the red light component and reflects the green light component and the blue light component. The dichroic mirror 220 reflects the green light component and transmits the blue light component. The reflection mirror 230 reflects the red light component. The reflection mirrors 240 and 250 reflect the blue light component.

The red light LR having passed through the dichroic mirror 210 is reflected off the reflection mirror 230, passes through the field lens 300R, and is incident on the image formation area of the light modulation apparatus 400R for red light. The green light LG reflected off the dichroic mirror 210 is further reflected off the dichroic mirror 220, passes through the field lens 300G, and is incident on the image formation area of the light modulation apparatus 400G for green light. The blue light LB having passed through the dichroic mirror 220 travels via the relay lens 260, the reflection mirror 240, the relay lens 270, the reflection mirror 250, and the field lens 300B and is incident on the image formation area of the light modulation apparatus 400B for blue light.

The light modulation apparatuses 400R, 400G, and 400B each include a liquid crystal panel. The light modulation apparatuses 400R, 400G, and 400B each modulate the color light incident thereon in accordance with image information to form an image corresponding to the color light. The configuration of the light modulation apparatuses 400R, 400G, and 400B will be described later in detail.

The light combiner 500 is formed of a cross dichroic prism. The light combiner 500 combines the image light outputted from the light modulation apparatus 400R, the image light outputted from the light modulation apparatus 400G, and the image light outputted from the light modulation apparatus 400B with one another. The cross-dichroic prism is formed of four right-angled prisms bonded to each other and therefore has a substantially square shape in the plan view, and dielectric multilayer films are formed on the substantially X-letter-shaped interfaces between the right-angled prisms bonded to each other.

The image light having exited out of the light combiner 500 is enlarged and projected by the projection optical apparatus 600 and form an image on a screen SCR. That is, the projection optical apparatus 600 projects light modulated by each of the light modulation apparatuses 400R, 400G, and 400B on the screen SCR. The projection optical apparatus 600 is formed of a plurality of lenses.

The optical module 31 will be described below.

Figure 2:
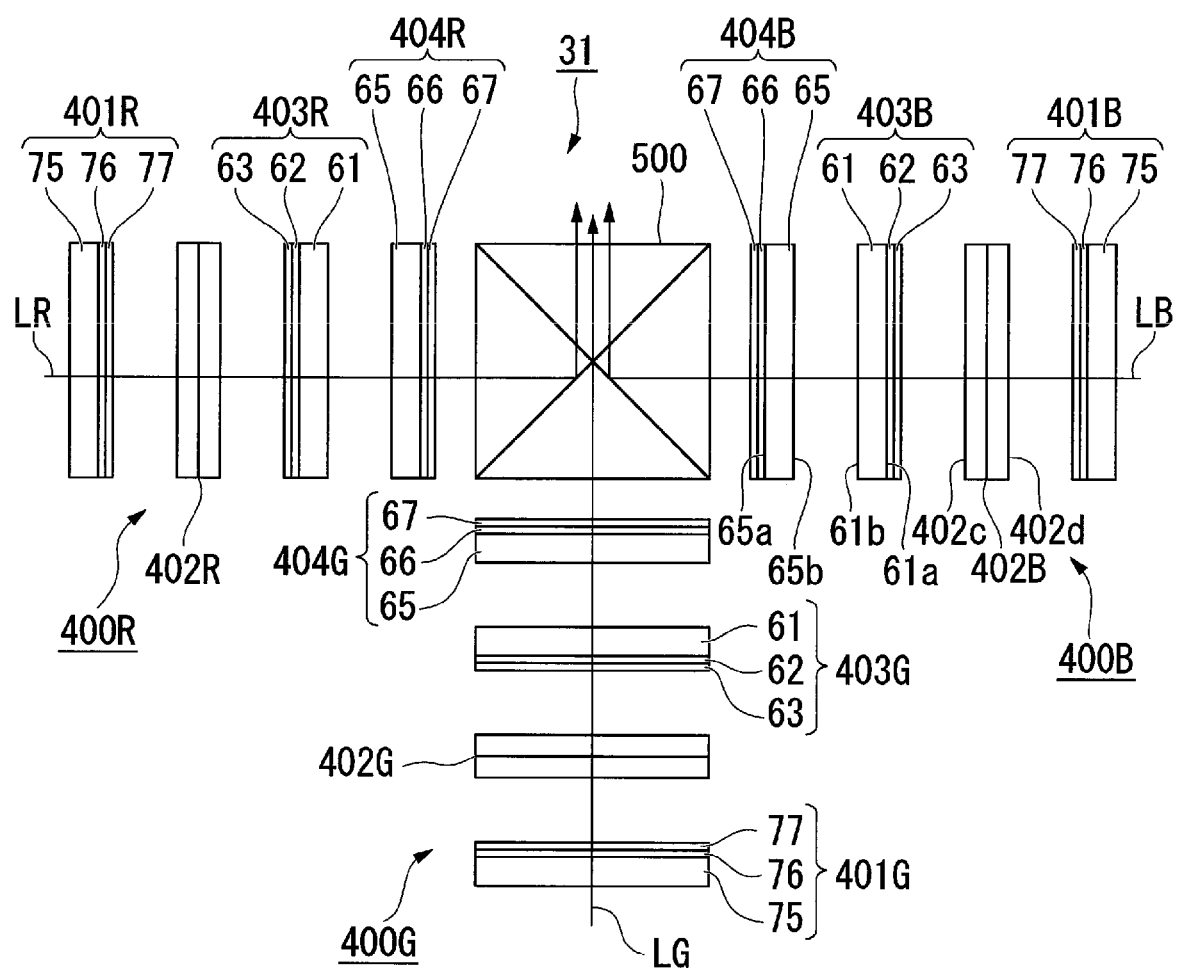
FIG. 2 is a schematic configuration diagram of an optical module according to the first embodiment.

FIG. 2 is a schematic configuration diagram of the optical module 31 according to the present embodiment.

The optical module 31 includes the light modulation apparatus 400B for blue light, the light modulation apparatus 400G for green light, the light modulation apparatus 400R for red light, and the light combiner 500, as shown in FIG. 2.

The light modulation apparatus 400B for blue light includes a light-incident-side polarizing plate 401B, a light modulator 402B for blue light, a first light-exiting-side polarizing plate 403B (first polarizer), and a second light-exiting-side polarizing plate 404B (second polarizer).

Similarly, the light modulation apparatus 400G for green light includes a light-incident-side polarizing plate 401G, a light modulator 402G for green light, a first light-exiting-side polarizing plate 403G (first polarizer), and a second light-exiting-side polarizing plate 404G (second polarizer).

The light modulation apparatus 400R for red light includes a light-incident-side polarizing plate 401R, a light modulator 402R for red light, a first light-exiting-side polarizing plate 403R (first polarizer), and a second light-exiting-side polarizing plate 404R (second polarizer).

In the present embodiment, the polarizing plates in the light modulator 400B for blue light, the light modulator 400G for green light, and the light modulator 400R for red light have a common configuration and arrangement. The light modulation apparatus 400B for blue light will therefore be described below as a representative light modulation apparatus, and the other light modulation apparatuses will not be described.

In the light modulation apparatus 400B for blue light, the light modulator 402B for blue light is formed of a transmissive liquid crystal panel including two light transmissive substrates and a liquid crystal layer. The light modulator 402B for blue light may include dustproof glass plates on the light incident side and the light exiting side of the liquid crystal panel described above. A method for driving the liquid crystal panel is not limited to a specific method, such as a longitudinal electric field method or a transverse electric field method.

The first light-exiting-side polarizing plate 403B is disposed on the downstream of the light modulator 402B for blue light, that is, on the light exiting side of the light modulator 402B for blue light. The first light-exiting-side polarizing plate 403B includes a first base 61, a first inorganic polarization layer 62, and a first light absorbing layer 63.

The first base 61 is formed of a light transmissive substrate and has a first surface 61a and a second surface 61b. The light transmissive substrate is made, for example, of low thermal expansion glass, such as quartz and crystallized glass. The light transmissive substrate may be made, for example, of alkali-free glass in place of low thermal expansion glass.

The first inorganic polarization layer 62 is formed of a wire-grid polarization layer provided on the first surface 61a of the first base 61. The wire-grid polarization layer is one type of structural birefringent polarization layer and has a structure in which minute ribs (not shown) extending in one direction are formed on a metal thin film formed on the first base 61. The metal thin film can be made of a metal, such as aluminum and tungsten, and formed by evaporation or sputtering. The ribs can be formed by the combination of a light exposure technology, such as a two-beam interference light exposure, electron drawing, and X-ray lithography, and an etching technology.

The ribs are formed at intervals shorter than the wavelength of the blue light LB incident on the light modulator 402B for blue light. The first inorganic polarization layer 62 can therefore reflect linearly polarized light having a polarization direction parallel to the direction in which the ribs extend and transmit linearly polarized light having a polarization direction perpendicular to the direction in which the ribs extend. The wire-grid polarization layer is made of an inorganic material and therefore extremely excels in heat resistance and hardly absorbs light.

The first light absorbing layer 63 is so provided as to face the first base 61 with the first inorganic polarization layer 62 sandwiched therebetween. That is, the first light absorbing layer 63 is layered on the first inorganic polarization layer 62 over the first surface 61a of the first base 61. The first light absorbing layer 63 is made of a material that absorbs light. The first light absorbing layer 63 absorbs part of the light incident thereon. The first light absorbing layer 63 therefore absorbs part of the light externally and directly incident on the first light absorbing layer 63 or part of the light reflected off the first inorganic polarization layer 62.

The second light-exiting-side polarizing plate 404B is disposed on the downstream of the first light-exiting-side polarizing plate 403B, that is, on the light exiting side of the first light-exiting-side polarizing plate 403B. The second light-exiting-side polarizing plate 404B includes a second base 65, a second inorganic polarization layer 66, and a second light absorbing layer 67.

The second base 65 is formed of a light transmissive substrate made, for example, of glass and has a third surface 65a and a fourth surface 65b. The light transmissive substrate is made, for example, of free-alkali glass. The light transmissive substrate may be made of low thermal expansion glass, such as quartz and crystallized glass, as is the first base 61 in place of alkali-free glass.

The second inorganic polarization layer 66 is formed of a wire-grid polarization layer provided on the third surface 65a of the second base 65. The configuration of the wire-grid polarization layer is the same as that of the wire-grid polarization layer that forms the first inorganic polarization layer 62.

The second light absorbing layer 67 is so provided as to face the second base 65 with the second inorganic polarization layer 66 sandwiched therebetween. That is, the second light absorbing layer 67 is layered on the second inorganic polarization layer 66 over the third surface 65a of the second base 65. The configuration of the second light absorbing layer 67 is the same as that of the first light absorbing layer 63.

The first light-exiting-side polarizing plate 403B is so disposed that the first light absorbing layer 63 faces a light exiting surface 402c of the light modulator 402B for blue light. The second light-exiting-side polarizing plate 404B is so disposed that the fourth surface 65b of the second base 65 faces the second surface 61b of the first base 61. In other words, the second light-exiting-side polarizing plate 404B is so disposed that the second light absorbing layer 67 faces the light combiner 500. The first light-exiting-side polarizing plate 403B and the second light-exiting-side polarizing plate 404B are thus so disposed that the first base 61 and the second base 65 face each other.

The light-incident-side polarizing plate 401B is disposed on the upstream of the light modulator 402B for blue light, that is, on the light incident side of the light modulator 402B for blue light. The light-incident-side polarizing plate 401B includes a third base 75, a third inorganic polarization layer 76, and a third light absorbing layer 77. The configuration of the light-incident-side polarizing plate 401B is the same as those of the first light-exiting-side polarizing plate 403B and the second light-exiting-side polarizing plate 404B. The light-incident-side polarizing plate 401B is so disposed that the third light absorbing layer 77 faces a light incident surface 402d of the light modulator 402B for blue light.

An optical module according to Comparative Example including a single light-exiting-side polarizing plate will now be described.

Figure 4:
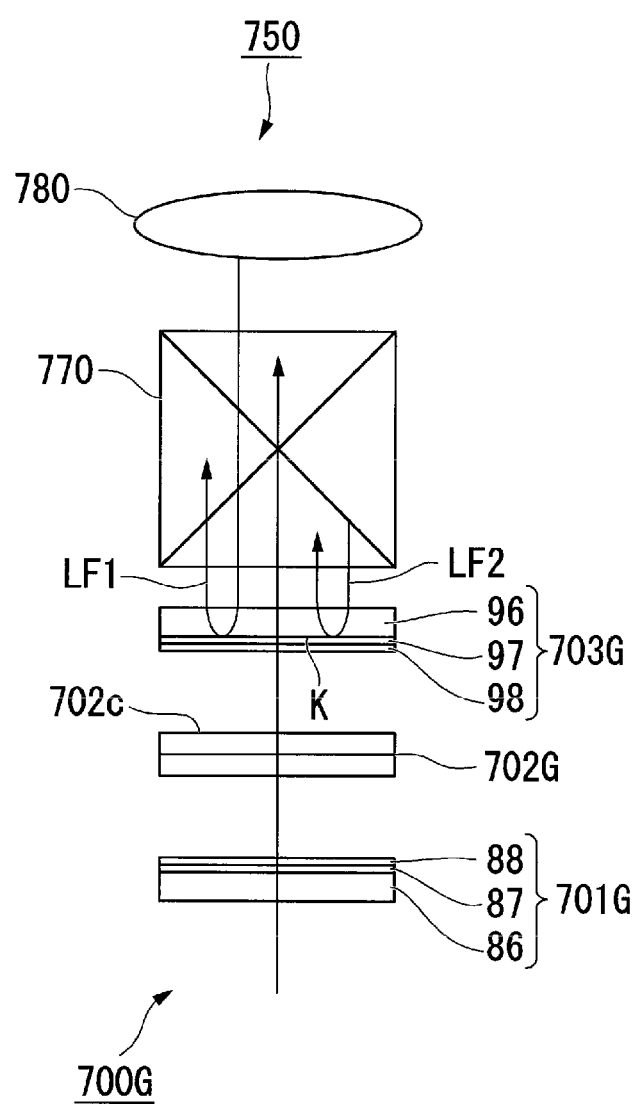
FIG. 4 describes the configuration of an optical module according to Comparative Example.

FIG. 4 describes the configuration of an optical module 750 according to Comparative Example.

In FIG. 4, no light modulation apparatus for blue light or light modulation apparatus for red light is shown.

The optical module 750 according to Comparative Example includes a light modulation apparatus 700G for green light and a light combiner 770, as shown in FIG. 4. The light modulation apparatus 700G for green light include a light-incident-side polarizing plate 701G, a light modulator 702G for green light, and alight-exiting-side polarizing plate 703G.

The light-incident-side polarizing plate 701G includes a base 86, an inorganic polarization layer 87 formed of a wire-grid polarization layer, and a light absorbing layer 88.

The light-exiting-side polarizing plate 703G includes a base 96, an inorganic polarization layer 97 formed of a wire-grid polarization layer, and a light absorbing layer 98. The light-exiting-side polarizing plate 703G is so disposed that the light absorbing layer 98 faces a light exiting surface 702c of the light modulator 702G for green light.

In the optical module 750 according to Comparative Example, assume that the light having exited out of the light-exiting-side polarizing plate 703G is reflected off a projection lens 780 or the light combiner 770. In this case, the light has a specific polarization direction at the point when the light exits out of the light-exiting-side polarizing plate 703G, but the polarization direction of the light is disturbed when the light is reflected off the projection lens 780 or the light combiner 770 or passes through the bases of the light-exiting-side polarizing plate 703G and the light combiner 770. Reflected light LF1 and reflected light LF2 are each therefore a mixture of light fluxes having different polarization directions.

When the reflected light LF1 and the reflected light LF2 reach a boundary surface K between the inorganic polarization layer 97 and the base 96 of the light-exiting-side polarizing plate 703G, the reflected light LF1 and the reflected light LF2 are reflected off the boundary surface K because the inorganic polarization layer 97 is made of aluminum, which has high reflectance, and the boundary surface K has no light absorbing layer. The reflected light LF1 and the reflected light LF2 reflected off the boundary surface K therefore form stray light and return light in the space between the light-exiting-side polarizing plate 703G and the projection lens 780 or the light combiner 770, resulting in a ghost and light leakage on the screen due to the stray light and return light in some cases.

In contrast, in the optical module 31 according to the present embodiment, the second light absorbing layers 67 of the second light-incident-side polarizing plates 404B, 404G, and 404R face the light combiner 500. Therefore, even when reflected light from the projection optical apparatus 600 or the light combiner 500 returns to the second light-incident-side polarizing plates 404B, 404G, and 404R, at least part of the reflected light is absorbed by the second light absorbing layers 67. The stray light and return light that occur in the spaces between the second light-incident-side polarizing plates 404B, 404G, and 404R and the projection optical apparatus 600 or the light combiner 500 can be suppressed, thus a ghost and light leakage on the screen SCR can be reduced.

Further, in the optical module 31 according to the present embodiment, since the first light absorbing layers 63 of the first light-incident-side polarizing plates 403B, 403G, and 403R face the light modulators 402B, 402G, and 402R, stray light and return light formed of light reflected off the first inorganic polarization layers 62 and returning to the light modulators 402B, 402G, and 402R can be suppressed. Moreover, the first base 61 is not present between each of the light modulators 402B, 402G, and 402R and the first inorganic polarization layer 62, so that the light having exited out of each of the light modulators 402B, 402G, and 402R is incident on the first inorganic polarization layer 62 before passing through the first base 61. The disturbance of the polarization direction that occurs when the light passes through the first bases 61 can therefore be suppressed, whereby a decrease in contrast of a projection image can be suppressed.

Further, in the optical module 31 according to the present embodiment, in which the third light absorbing layers 77 of the light-incident-side polarizing plates 401B, 401G, and 401R face the light modulators 402B, 402G, and 402R, the third base 75 is not present in the space between the third inorganic polarization layers 76 and each of the light modulators 402B, 402G, and 402R, so that the light having exited out of the third inorganic polarization layers 76 does not pass through the third bases 75 but is incident on the light modulators 402B, 402G, and 402R. The disturbance of the polarization direction that occurs when the light passes through the third bases 75 can therefore be suppressed, whereby a decrease in contrast of a projection image can be suppressed.

In the optical module 31 according to the present embodiment, the first bases 61 of the first light-incident-side polarizing plates 403B, 403G, and 403R and the second bases 65 of the second light-exiting-side polarizing plates 404B, 404G, and 404R are each made of low thermal expansion glass. Therefore, even when heat is generated when the light enters the first light-incident-side polarizing plates 403B, 403G, and 403R and the second light-exiting-side polarizing plates 404B, 404G, and 404R, distortion of the first bases 61 and the second bases 65 due to the heat can be suppressed to a small value. Therefore, even when the temperatures of the first bases 61 and the second bases 65 increase, disturbance of the polarization direction of the light passing through the first bases 61 and the second bases 65 can be suppressed, whereby a decrease in contrast of a projection image can be suppressed.

In the optical module 31 according to the present embodiment, in which two polarizing plates are provided on the downstream of each of the light modulators 402B, 402G, and 402R, that is, on the first light-incident-side polarizing plates 403B, 403G, and 403R and the second light-exiting-side polarizing plates 404B, 404G, and 404R, the extinction ratio of the entire light-exiting-side polarizing plates can be increased as compared with that when one polarizing plate is provided. As a result, the present embodiment allows an increase in contrast of a projection image.

The projector 1 according to the present embodiment, which includes the optical module 31 described above, excels in quality of a projection image.

Second Embodiment

A second embodiment of the present disclosure will be described below with reference to FIG. 3.

The configuration of a projector according to the second embodiment is the same as that in the first embodiment, and the configuration of the optical module differs from that in the first embodiment. The entire projector will therefore not be described.

Figure 3:
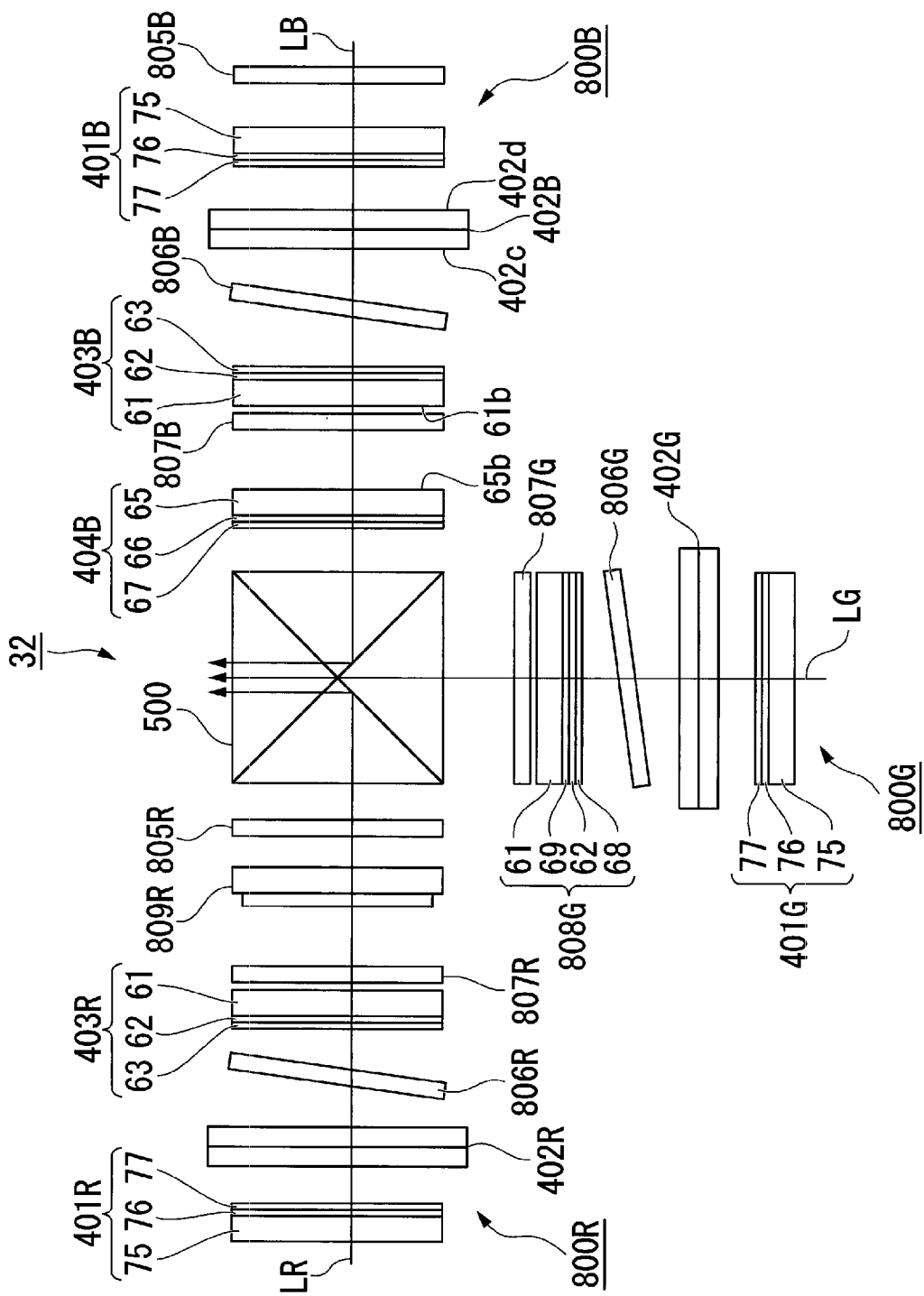
FIG. 3 is a schematic configuration diagram of an optical module according to a second embodiment.

FIG. 3 is a schematic configuration diagram of an optical module 32 according to the second embodiment.

In FIG. 3, components common to those in FIG. 2 in the first embodiment have the same reference characters and will not be described.

The optical module 32 according to the present embodiment includes a light modulation apparatus 800B for blue light, a light modulation apparatus 800G for green light, a light modulation apparatus 800R for red light, and the light combiner 500, as shown in FIG. 3.

The light modulation apparatus 800B for blue light includes a retardation film 805B, the light-incident-side polarizing plate 401B, the light modulator 402B for blue light, an optical compensation plate 806B, the first light-exiting-side polarizing plate 403B (first polarizer), a heat dissipating plate 807B, the second light-exiting-side polarizing plate 404B (second polarizer).

The light modulation apparatus 800G for green light includes the light-incident-side polarizing plate 401G, the light modulator 402G for green light, an optical compensation plate 806G, a light-exiting-side polarizing plate 808G, and a heat dissipating plate 807G.

The light modulation apparatus 800R for red light includes the light-incident-side polarizing plate 401R, the light modulator 402R for red light, an optical compensation plate 806R, the first light-exiting-side polarizing plate 403R, a heat dissipating plate 807R, and a second light-exiting-side polarizing plate 809R, and a retardation film 805R.

As described above, in the second embodiment, the light modulation apparatus 800B for blue light, the light modulation apparatus 800G for green light, and the light modulation apparatus 800R for red light have configurations differed from one another, unlike in the first embodiment. Specifically, in the second embodiment, the light modulation apparatus 800B for blue light includes two inorganic polarization plates on the downstream of the light modulator 402B for blue light, the light modulation apparatus 800G for green light includes one inorganic polarization plate on the downstream of the light modulator 402G for green light, and the light modulation apparatus 800R for red light includes one inorganic polarization plate and one organic polarization plate on the downstream of the light modulator 402R for red light.

In the light modulation apparatus 800B for blue light, the retardation film 805B is disposed on the upstream of the light-incident-side polarization plate 401B, that is, on the light incident side of the light-incident-side polarization plate 401B. The retardation film 805B is formed of a half-wave plate. The retardation film 805B imparts retardation corresponding to half the wavelength of the light passing through the retardation film 805B to the light. First linearly polarized light (P-polarized light, for example) incident on the retardation film 805B is therefore converted into second linearly polarized light (S-polarized light, for example) having a polarization direction perpendicular to the polarization direction of the first linearly polarized light when passing through the retardation film 805B.

The light-incident-side polarization plate 401B is disposed on the upstream of the light modulator 402B for blue light, that is, on the light incident side of the light modulator 402B for blue light. The light-incident-side polarization plate 401B includes the third base 75, the third inorganic polarization layer 76, and the third light absorbing layer 77. The light-incident-side polarization plate 401B is so disposed that the third light absorbing layer 77 faces the light incident surface 402d of the light modulator 402B for blue light.

The light modulator 402B for blue light is formed of a transmissive liquid crystal panel containing two light transmissive substrates and a liquid crystal layer. The light modulator 402B for blue light may include dustproof glass plates on the light incident side and the light exiting side of the liquid crystal panel described above. A method for driving the liquid crystal panel is not limited to a specific method, such as a longitudinal electric field method or a transverse electric field method.

The optical compensation plate 806B is disposed on the downstream of the light modulator 402B for blue light, that is, on the light exiting side of the light modulator 402B for blue light. In the case of a liquid crystal projector, when light leakage occurs when light obliquely passes through the light modulator, the contrast of an image decreases. The optical compensation plate 806B, which compensates the retardation of the light obliquely passing through the light modulator, can suppress a decrease in the contrast.

The first light-exiting-side polarization plate 403B is disposed on the downstream of the optical compensation plate 806B, that is, on the light exiting side of the optical compensation plate 806B. The first light-exiting-side polarization plate 403B includes the first base 61, the first inorganic polarization layer 62 formed of a wire-grid polarization layer, and the first light absorbing layer 63. The configuration of the first light-exiting-side polarization plate 403B is the same as that of the first light-exiting-side polarization plate in the first embodiment.

The heat dissipating plate 807B is disposed on the downstream of the first light-exiting-side polarization plate 403B, that is, on the light exiting side of the first light-exiting-side polarization plate 403B. The heat dissipating plate 807B is formed of a plate made, for example, of sapphire glass having high thermal conductivity and high optical transparency. The heat dissipating plate 807B may be in contact with the first light-exiting-side polarization plate 403B or may be slightly separate from the first light-exiting-side polarization plate 403B. Out of the two light-exiting-side polarization plates 403B and 404B, heat is likely to be generated in the first light-exiting-side polarization plate 403B, on which light is first incident. In view of the fact described above, the heat dissipating plate 807B, which dissipates the heat in the first light-exiting-side polarization plate 403B out thereof, can suppress an increase in temperature of the first light-exiting-side polarization plate 403B and can therefore ensure the reliability of the first light-exiting-side polarization plate 403B.

The second light-exiting-side polarization plate 404B is disposed on the downstream of the heat dissipating plate 807B, that is, on the light exiting side of the heat dissipating plate 807B. The second light-exiting-side polarization plate 404B includes the second base 65, the second inorganic polarization layer 66, and the second light absorbing layer 67. The configuration of the second light-exiting-side polarization plate 404B is the same as that of the second light-exiting-side polarization plate in the first embodiment.

The first light-exiting-side polarization plate 403B is so disposed that the first light absorbing layer 63 faces the light exiting surface 402c of the light modulator 402B for blue light with the optical compensation plate 806B sandwiched therebetween. The second light-exiting-side polarization plate 404B is so disposed that the fourth surface 65b of the second base 65 faces the second surface 61b of the first base 61 with the heat dissipating plate 807B sandwiched therebetween. In other words, the second light-exiting-side polarization plate 404B is so disposed that the second light absorbing layer 67 faces the light combiner 500.

In the light modulation apparatus 800G for green light, the light-exiting-side polarization plate 808G is disposed on the downstream of the light modulator 402G for green light, that is, on the light exiting side of the light modulator 402G for green light. The light-exiting-side polarization plate 808G includes the base 61, the inorganic polarization layer 62, a first light absorbing layer 68, and a second light absorbing layer 69. In the case of the light modulation apparatus 800G for green light, in which only one light-exiting-side polarization plate 808G is provided, the second light absorbing layer 69 is provided between the base 61 and the inorganic polarization layer 62 in order to suppress stray light and return light formed of light reflected off the inorganic polarization layer 62 and returning to the light combiner 500 in addition to the first light absorbing layer 68.

In the light modulation apparatus 800R for red light, the first light-exiting-side polarization plate 403R is disposed on the downstream of the light modulator 402R for red light, that is, on the light exiting side of the light modulator 402R for red light. The first light-exiting-side polarization plate 403R includes the first base 61, the first inorganic polarization layer 62 formed of a wire-grid polarization layer, and the first light absorbing layer 63. The configuration of the first light-exiting-side polarization plate 403R is the same as that of the first light-exiting-side polarization plate in the first embodiment.

The heat dissipating plate 807R is disposed on the downstream of the first light-exiting-side polarization plate 403R, that is, on the light exiting side of the first light-exiting-side polarization plate 403R. The configuration of the heat dissipating plate 807R is the same as that of the heat dissipating plate 807B in the light modulation apparatus 800B for blue light.

The second light-exiting-side polarization plate 809R is disposed on the downstream of the heat dissipating plate 807R, that is, on the light exiting side of the heat dissipating plate 807R. The second light-exiting-side polarization plate 809R is formed of an organic polarization plate made of a resin material. The degree of polarization provided by the second light-exiting-side polarization plate 809R may be lower than the degree of polarization provided by the first light-exiting-side polarization plate 403R. For example, the ratio of the degree of polarization between the first light-exiting-side polarization plate 403R and the second light-exiting-side polarization plate 809R may be about 2:1.

The other configurations of the optical module 32 are the same as those of the optical module 31 according to the first embodiment.

Also in the optical module 32 according to the present embodiment, the second light absorbing layer 67 of the second light-exiting-side polarization plate 404B faces the light combiner 500 in the light modulation apparatus 800B for blue light. Therefore, even when blue reflected light from the projection optical apparatus 600 or the light combiner 500 returns to the second light-incident-side polarizing plate 404B, at least part of the blue reflected light is absorbed by the second light absorbing layers 67. The stray light and return light of the blue light LB that occur in the space between the second light-incident-side polarizing plate 404B and the projection optical apparatus 600 or the light combiner 500 can thus be suppressed.

As for the green light LG, the second light absorbing layer 69 of the light-exiting-side polarization plate 808G is so provided as to face the light combiner 500, whereby the stray light and return light that occur in the space between the inorganic polarization layer 62 and the projection optical apparatus 600 or the light combiner 500 can be suppressed.

As for the red light LR, the second light-exiting-side polarization plate 809R formed of an organic polarization plate is provided between the first light-exiting-side polarization plate 403R and the light combiner 500, whereby the reflected light from the projection optical apparatus 600 or the light combiner 500 is absorbed by the second light-exiting-side polarization plate 809R. The optical module 32 according to the present embodiment can therefore reduce the amount of reflected light from the projection optical apparatus 600 or the light combiner 500 not only in the light modulation apparatus 800B for blue light, which is the same light modulation apparatus in the first embodiment, but in the light modulation apparatus 800G for green light and the light modulation apparatus 800R for red light, whereby a ghost and light leakage on the screen SCR can be reduced.

In the optical module 32 according to the present embodiment, the light modulation apparatus 800G for green light uses only one light-exiting-side polarization plate 808G because the contrast of the green light LG is originally high as compared with the contrast of the blue light LB and the red light LR and it is therefore unnecessary to particularly increase the extinction ratio of the light-exiting-side polarization plate. Further, in the light modulation apparatus 800R for red light, one of the two light-exiting-side polarization plates is an organic polarization plate because the energy of the red light RL is lower than the energy of the blue light LB and the green light LG, and no problem therefore occurs with the reliability of the polarization plate. The different configurations of the light modulation apparatuses on the color light basis described above therefore allow simplification and cost reduction of the configuration of the optical module 32.

Also in the optical module 32 according to the present embodiment, the same effect provided in the first embodiment can be provided. For example, the first light absorbing layers 63 of the first light-exiting-side polarization plates 403B and 403R and the first light absorbing layer 68 of the light-exiting-side polarization plate 808G face the light modulating devices 402B, 402R, and 402G, and the third light absorbing layers 77 of the light-incident-side polarization plates 401B, 401G, and 401R face the light modulating devices 402B, 402G, and 402R, whereby a decrease in contrast of a projection image can be suppressed.

The technical range of the present disclosure is not limited to the embodiments described above, and a variety of changes can be made thereto to the extent that the changes do not depart from the substance of the present disclosure.

For example, the above embodiments have been presented with reference to the case where the first and second inorganic polarization layers are each formed of a wire-grid polarization layer. The first and second inorganic polarization layers may instead be each formed of an inorganic polarization layer so formed that inorganic materials are layered on each other in place of a wire-grid polarization layer.

The first embodiment has been presented with reference to the case where the configuration of the light modulation apparatus according to the present disclosure is applied to all the light modulation apparatus for blue light, the light modulation apparatus for green light, and the light modulation apparatus for red light, and the second embodiment has been presented with reference to the case where the configuration of the light modulation apparatus according to the present disclosure is applied to only the light modulation apparatus for blue light. However, the present disclosure is not limited to these configurations. The configuration of the light modulation apparatus according to the present disclosure may be applied to at least one the light modulation apparatus for blue light, the light modulation apparatus for green light, and the light modulation apparatus for red light.

In addition to the above, the shape, the number, the arrangement, the material, and other specific descriptions of the light modulation apparatus, the optical module, and the projector are not limited to those in the embodiments described above and can be changed as appropriate. In the projector according to the embodiments described above, a light source apparatus including a wavelength converter containing a phosphor and an excitation light source has been presented by way of example, but not necessarily. For example, a light source apparatus including a discharge lamp may be used, or a light source apparatus including a solid-state light source, such as a laser light source and a light emitting diode light source, may be used.

What is claimed is:

1. A light modulation apparatus comprising:
a light modulator that modulates light;
a first polarizer on which light outputted from the light modulator is incident; and
a second polarizer on which light outputted from the first polarizer is incident,
wherein the first polarizer includes a first base having a first surface and a second surface, a first light absorbing layer so provided as to face the first base, and a first inorganic polarization layer provided on the first surface and disposed between the first base and the first light absorbing layer,
the second polarizer includes a second base having a third surface and a fourth surface, a second light absorbing layer so provided as to face the second base, and a second inorganic polarization layer provided on the third surface and disposed between the second base and the second light absorbing layer,
the first polarizer is so disposed that the first light absorbing layer faces a light exiting surface of the light modulator, and
the second polarizer is so disposed that the fourth surface of the second base faces the second surface of the first base.

2. The light modulation apparatus according to claim 1, wherein the first inorganic polarization layer is a wire-grid polarization layer.

3. The light modulation apparatus according to claim 1, wherein the second inorganic polarization layer is a wire-grid polarization layer.

4. The light modulation apparatus according to claim 1, wherein at least one of the first and second bases is made of low thermal expansion glass.

5. An optical module comprising:
a first light modulation apparatus that modulates first color light;
a second light modulation apparatus that modulates second color light;
a third light modulation apparatus that modulates third color light; and
a light combiner that combines the first color light modulated by the first light modulation apparatus, the second color light modulated by the second light modulation apparatus, and the third color light modulated by the third light modulation apparatus to produce combined light,
wherein at least one of the first light modulation apparatus, the second light modulation apparatus, and the third light modulation apparatus is the light modulation apparatus according to claim 1.

6. A projector comprising:
a light source apparatus that outputs light;
the optical module according to claim 5 on which the light outputted from the light source apparatus is incident and which outputs the combined light; and
a projection optical apparatus that projects the combined light outputted from the optical module on a projection surface.

7. A projector comprising:
a light source apparatus that outputs light;
the light modulation apparatus according to claim 1 that modulates the light outputted from the light source apparatus; and
a projection optical apparatus that projects the light modulated by the light modulation apparatus on a projection surface.

8. A projector comprising:
a light source apparatus that outputs light;
the light modulation apparatus according to claim 2 that modulates the light outputted from the light source apparatus; and
a projection optical apparatus that projects the light modulated by the light modulation apparatus on a projection surface.

9. A projector comprising:
a light source apparatus that outputs light;
the light modulation apparatus according to claim 3 that modulates the light outputted from the light source apparatus; and
a projection optical apparatus that projects the light modulated by the light modulation apparatus on a projection surface.

10. A projector comprising:
a light source apparatus that outputs light;
the light modulation apparatus according to claim 4 that modulates the light outputted from the light source apparatus; and
a projection optical apparatus that projects the light modulated by the light modulation apparatus on a projection surface.

* * * * *